United States Patent [19]

Bradshaw et al.

[11] Patent Number: 5,089,969

[45] Date of Patent: Feb. 18, 1992

[54] SHAFT SYNCHRONOUS BALANCING APPARATUS

[75] Inventors: Charles Bradshaw, Bedworth Warks; Bill Tack, Yelvertoft; Mike Hansford, Rugby; John Winterbottom, Eastern Green Conventry, all of Great Britain

[73] Assignee: IRD Mechanalysis, Inc., Columbus, Ohio

[21] Appl. No.: 482,550

[22] Filed: Feb. 21, 1990

[30] Foreign Application Priority Data

Jul. 13, 1989 [EP] European Pat. Off. ........ 89630117.3

[51] Int. Cl.$^5$ .................. G06F 15/20; G01M 1/16; G01M 1/00; G01M 7/00
[52] U.S. Cl. .................................. 364/463; 73/460; 73/462; 364/508
[58] Field of Search ............... 364/508, 506, 463; 73/462, 66, 460

[56] References Cited

U.S. PATENT DOCUMENTS

| | | | |
|---|---|---|---|
| Re. 31,971 | 8/1985 | Gold | 73/462 |
| 4,015,480 | 4/1977 | Giers | 73/462 |
| 4,020,423 | 4/1977 | Guyot et al. | 328/151 |
| 4,298,949 | 11/1981 | Davis | 364/603 |
| 4,357,832 | 11/1982 | Blackburn et al. | 73/462 |
| 4,457,172 | 7/1984 | Mathes et al. | 73/462 |
| 4,535,411 | 8/1985 | Blackburn et al. | 73/462 X |
| 4,608,650 | 8/1986 | Kapadia | 364/508 |
| 4,868,762 | 9/1989 | Grim et al. | 364/508 |

FOREIGN PATENT DOCUMENTS

| | | |
|---|---|---|
| 0045505 | 2/1982 | European Pat. Off. . |
| 2724696 | 3/1980 | Fed. Rep. of Germany . |
| 2198298 | 3/1974 | France . |
| 2551209 | 3/1985 | France . |

*Primary Examiner*—Parshotam S. Lall
*Assistant Examiner*—Edward J. Pipala
*Attorney, Agent, or Firm*—Mueller and Smith

[57] ABSTRACT

A shaft synchronous balancing apparatus wherein a rotor to be balanced is rotated in conjunction with appropriate balance plane located transducers and a non-contacting shaft monitoring pick-up, for example of an optical variety. The latter pick-up derives a one times per revolution reference signal which is treated by a software driven process control system including dual timer-counters to evaluate the period of revolution, T, and to develop N incremental sampling pulses having a duration or time constant of T/N. Preferably, N is an even integer power of 2. Periodic updating of the duration of a time constant is developed utilizing only one software interrupt in conjunction with the two counter timers. A nulling technique for canceling offset at the signal treatment stages is provided which accommodates for the high amplification levels necessary at the front end of the system. Additionally, a gain adjust feature achieves optimum precision and reliability for the system by performing within three discrete ranges.

17 Claims, 10 Drawing Sheets

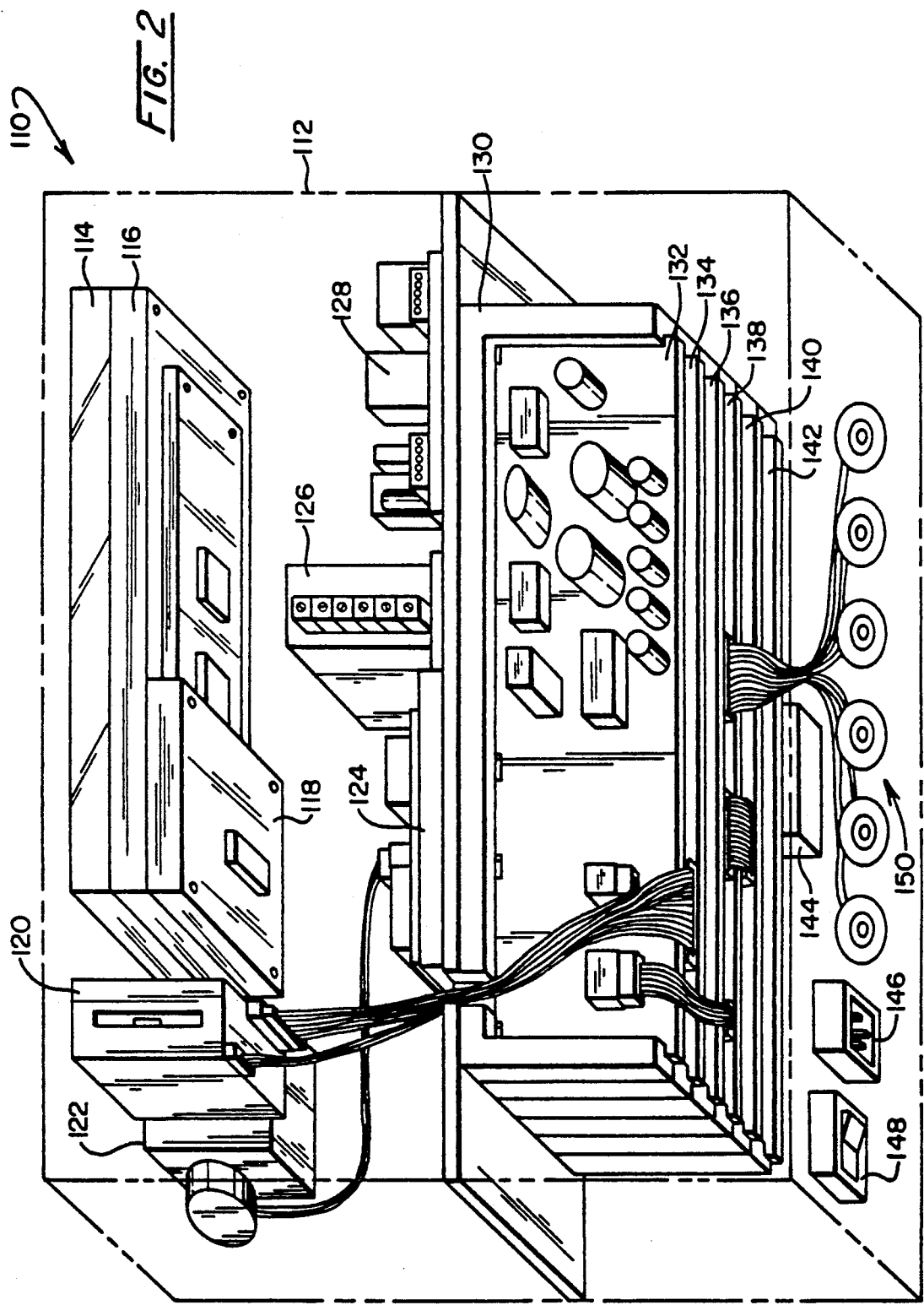

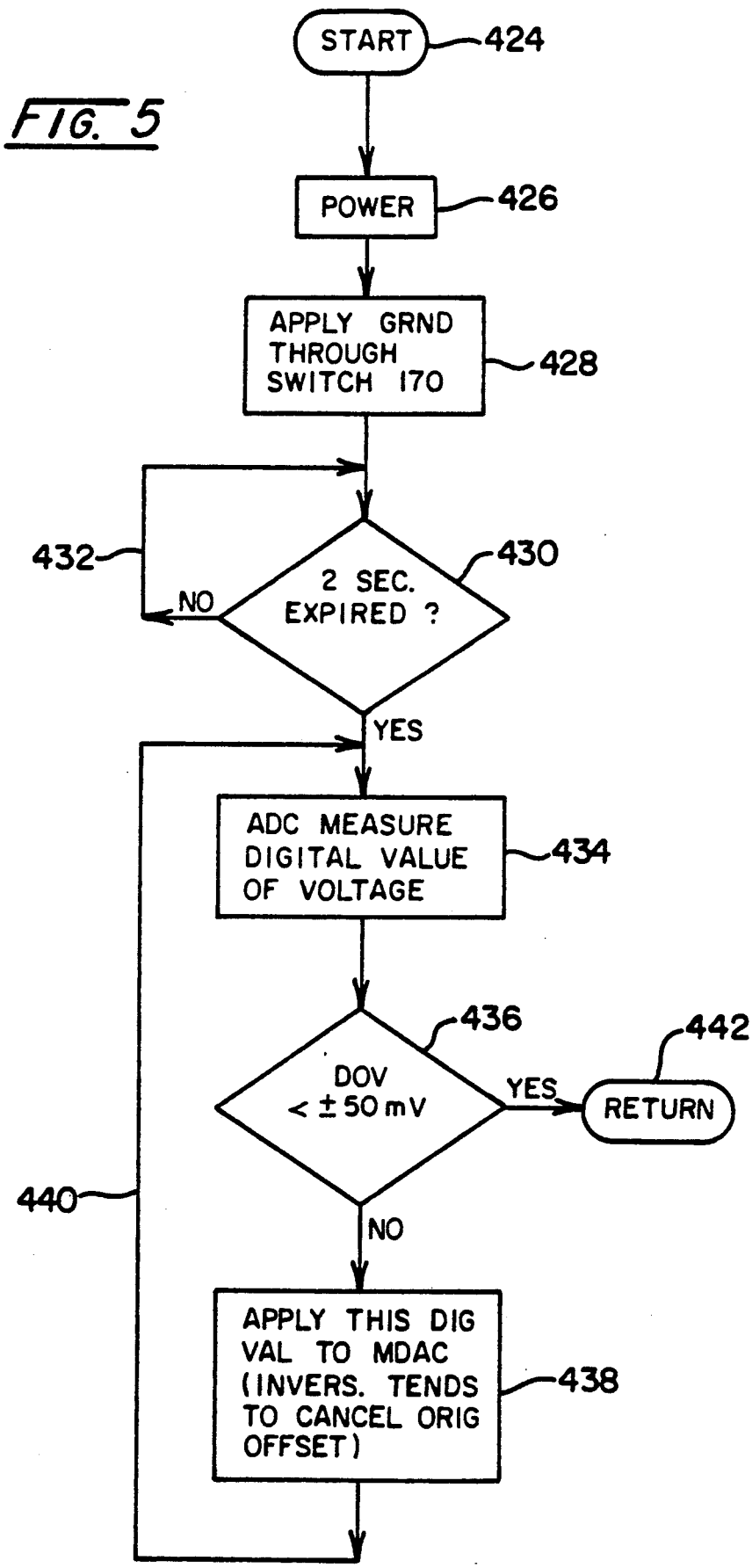

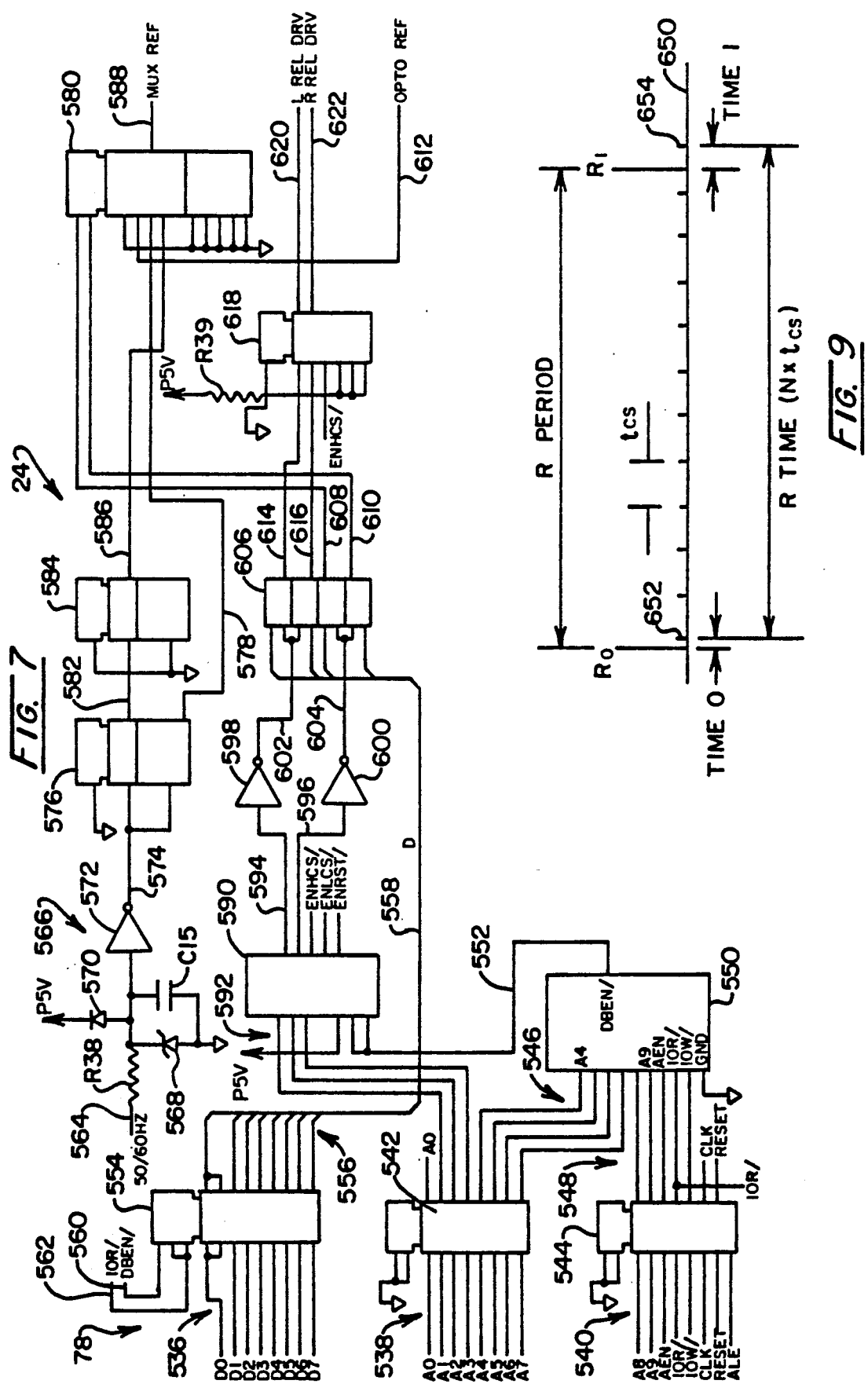

SHAFT SYNCHRONOUS BALANCING APPARATUS

BACKGROUND OF THE INVENTION

The balancing of rotational components in various mechanical devices and systems has been a subject of investigation and development throughout modern industrial history. Where rotary components are operated under conditions of balance falling within acceptable performance parameters, their efficiency and operational lifespans are considerably improved. Thus industry has recognized that cost justification of the efforts involved in balancing procedures.

Approaches to balancing techniques may vary somewhat. More dedicated devices for balancing are operated in conjunction with supports or pedestals having predetermined geometries and rotor bearing characteristics upon which the element to be balanced is mounted. Such devices may provide for a "soft" mounting wherein unbalance induced movement of the balance rotor or component is controllably permitted. Alternately, the balancing structures may provide a "hard" or rigid support for the component being balanced. These assemblies also will include vibration or thrust responsive transducers at specific positions or "planes", phase or rotational position monitors and the like. Additionally, vibratory components referred to as "shakers" may be mounted in conjunction with each designated plane of a balancing system to carry out preliminary calibration activities. Generally, a form of "time synchronous averaging" is employed by these devices wherein, during the rotation of the component or rotor under balance is carried out and data are accumulated over a period of time to produce vector categorized signals which, in effect, represent a filtered evaluation of rotor balance. Such balancing techniques are described, for example, in Davis, U.S. Pat. No. 4,298,948, entitled "Method and Apparatus for Generating a Digital Representation of the Instantaneous Angular Position of a Rotating Body and for Generating Rectangular Coordinate Equivalents Thereof", issued Nov. 3, 1981. Improvements in the automated approach to balancing through employment of microprocessors and the like have achieved important efficiencies for industry. In this regard, reference is made to Blackburn, et al., U.S. Pat. No. 4,357,832, entitled "Digital Electronic Balancing Apparatus", issued Nov. 9, 1982, describing an arrangement for two-plane dynamic balancing with automated development of information for corrective weight positioning.

Industry also has looked to the development of balancing techniques for rotor components which are located in the field, i.e. at the situs of the industrial equipment, as described in the noted U.S. Pat. No. 4,357,832. Manual approaches to field balancing have been employed for some considerable period of time. In this regard, the reader's attention is directed to a publication entitled "Dynamic Balancing of Rotating Machinery in the Field", by E. H. Thearle, *Transactions of the American Society of Mechanical Engineers*, October, 1934, No. 743. These early field balancing approaches required that personnel in the field carry out a sequence of relatively extended procedures and mathematical computations. Later, the mathematical tasks required of the operator were ameliorated with the introduction of programmable portable calculating devices. With such devices, the mental and graphic mathematical steps required otherwise of the operator were substantially eliminated, however, the insertion of data still remained a manual task. Blackburn, et al., U.S. Pat. No. 4,535,411 entitled "Field Balancing Apparatus" issued Aug. 13, 1985, describes a microprocessor driven field balancing device which incorporates a display and switching arrangement providing tutorial prompts to the operator to assure more efficient balancing performance. The system described therein employs a trial weight system for balancing and incorporates a program which not only effects the computation of balancing correctional data, but also provides for the carrying out of time saving trim balancing techniques.

Early approaches to the digitization of balancing data were proposed by Gears in Federal Republic of Germany Patentschrift DE 2459282 C2 granted Mar. 17, 1988.

Another balancing technique is through implementation of a "shaft synchronous averaging technique". With this approach, each period of revolution of the rotor or shaft to be balanced is divided into equal increments. Increment-by-increment multiplication of the instant vibration amplitudes of the rotor under balance then are complied in conjunction with sine and cosine phasing terms to achieve a filtering. This approach may be employed, for example, with lower or more practical rotational balancing speeds and may achieve the final balancing result in lowered time elements. In this regard, Mortensen, U.S. Pat. No. 4,060,002 entitled "Apparatus for the Determination of Unbalance in Rotating Bodies" issued Nov. 29, 1977, describes a shaft synchronous approach in which the requisite shaft data are developed by applying a disk-shaped angular position indicating device to the shaft of the rotor being balanced. This provides necessary phase information, however, the application of such shaft encoding devices tends to induce unbalance in and of itself which upsets the quality of a final balance. This is particularly true where very small rotors are under balance.

SUMMARY

The present invention is addressed to a system and apparatus for carrying out the balance analysis of rotors employing a shaft synchronous averaging approach. A non-contacting pick-up is utilized as a reference device for determining rotor phase information such that no adverse dynamic effects are imposed upon the balancing process by the procedure of monitoring its rotation. Incremental sampling based upon this phase information derived by rotational monitoring is developed by a control system which looks to anticipated periods of rotation of the rotor under balance. These periods of rotation are periodically updated by a dual counter-timer-software driven procedure.

User friendly accuracy and precision also is achieved through the utilization of a periodically-asserted unique offset nulling technique and input signal gain treatment.

Another feature of the invention is to provide in a system for deriving balance data of a variety wherein a rotating body to be balanced is rotated at rates providing a period, T, for each complete revolution, wherein a transducer is provided for select balance planes which derives corresponding vibration output signals, the improved balance analysis apparatus which includes a reference device responsive to the rotating body for deriving a reference signal with respect to the revolution thereof in correspondence with each period, T and a signal treatment staging which is responsive to the vibration output signals for deriving analog balance signals in correspondence therewith. A countertimer is responsive to a control input for generating a sequence of predetermined number, N, of increment sample pulses of select duration. A converter is provided which is actuable to convert the vibrational output signals to digital values, and a process control is provided which is responsive to the reference signal with respect to a given revolution of the rotating body for deriving the value of select duration of the increment sample pulses as the control input to the counter timer, the select duration substantially corresponding with the value T/N. The process control further effects the activation of the converter in correspondence with the increment sample pulses during a revolution of the rotating body subsequent to the given revolution to effect derivation of the digital values and for generating the balance data therefrom.

Another feature of the invention provides, in a system for deriving balance data of a variety wherein a rotating body to be balanced is subject to balance rotation and wherein a transducer is provided for select balance planes associated with a rotor body during the balance rotation, which transducers derive corresponding vibration output signals, the improved balance analysis apparatus which includes an input signal treatment network having an input signal treatment and application stage for receiving the vibration output signals and effecting the amplification thereof in accordance with one of a number of selected gain values to provide amplified vibration signals. The input signal treatment further has an integration stage and a solid-state disable switch actuable to effect the disablement of the integration stage. A gain control network is responsive to a gain select input for providing the select gain values and an analog-to-digital converter responds to the amplified vibration signals and is actuable to generate digital sample signals corresponding therewith. A process control provides an initial gain select input to the gain control network for actuating the converter to effect generation of a predetermined number of initial digital sample signals and is responsive to generated initial sample signals to derive the gain select input providing selection of a highest gain for effecting an amplification of the vibration output signals for derivation of the digital sample signals within a predetermined optimum range of values, the process control actuating the solid-state disable switch for a predetermined settlement interval in correspondence with the derivation of a select gain input.

Another feature of the invention is to provide, in a system for deriving balance data of a variety wherein a rotating body to be balanced is subject to balance rotation and wherein a transducer is provided for select balance planes associated with the rotating body during the balance rotation, the transducer deriving corresponding vibration output signals, the improved balance analysis apparatus which includes an input amplification and signal treatment stage having an input for receiving the vibration output signals and effecting a gain treatment thereof to provide amplified vibration signals at the output and exhibiting a d.c. offset signal term of given polarity. A grounding arrangement is provided for exhibiting a predetermined standard level signal value and a solid-state switch is actuable for isolating the amplification and signal treatment stage input from the vibration output signals and applying the ground arrangement standard level signal value thereto. An analog-to-digital converter provides an input for receiving signals from the input amplification and signal treatment stage output and converts them to corresponding digital signals. A digital-to-analog converter network is responsive, when enabled, to the digital signals for deriving a d.c. displacement signal in correspondence therewith and of polarity opposite the given polarity for continuous application to the input amplification and signal treatment stage as a substantial cancellation of the d.c. offset signal term. A process control is provided for recurrently actuating the solid-state switch and enabling the digital-to-analog network for effecting the derivation of a d.c. displacement signal for subsequent continuous application thereof to the input amplification and signal treatment stage.

Other objects of the invention will, in part, be obvious and will, in part, appear hereinafter.

The invention, accordingly, comprises the apparatus and system possessing the construction, combination of elements, and arrangement of parts which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 2 is a perspective representation of a console incorporating the apparatus of the invention showing portions in phantom to reveal internal structure;

FIG. 5 is a flow diagram of an offsetting routine employed with a processing feature of the invention;

FIG. 7 is an electrical schematic diagram of shaker drive and optical reference signal treating features of the invention;

FIG. 9 is a diagram illustrating a sampling interval adjustment feature of the invention.

DETAILED DESCRIPTION

Figure 1:
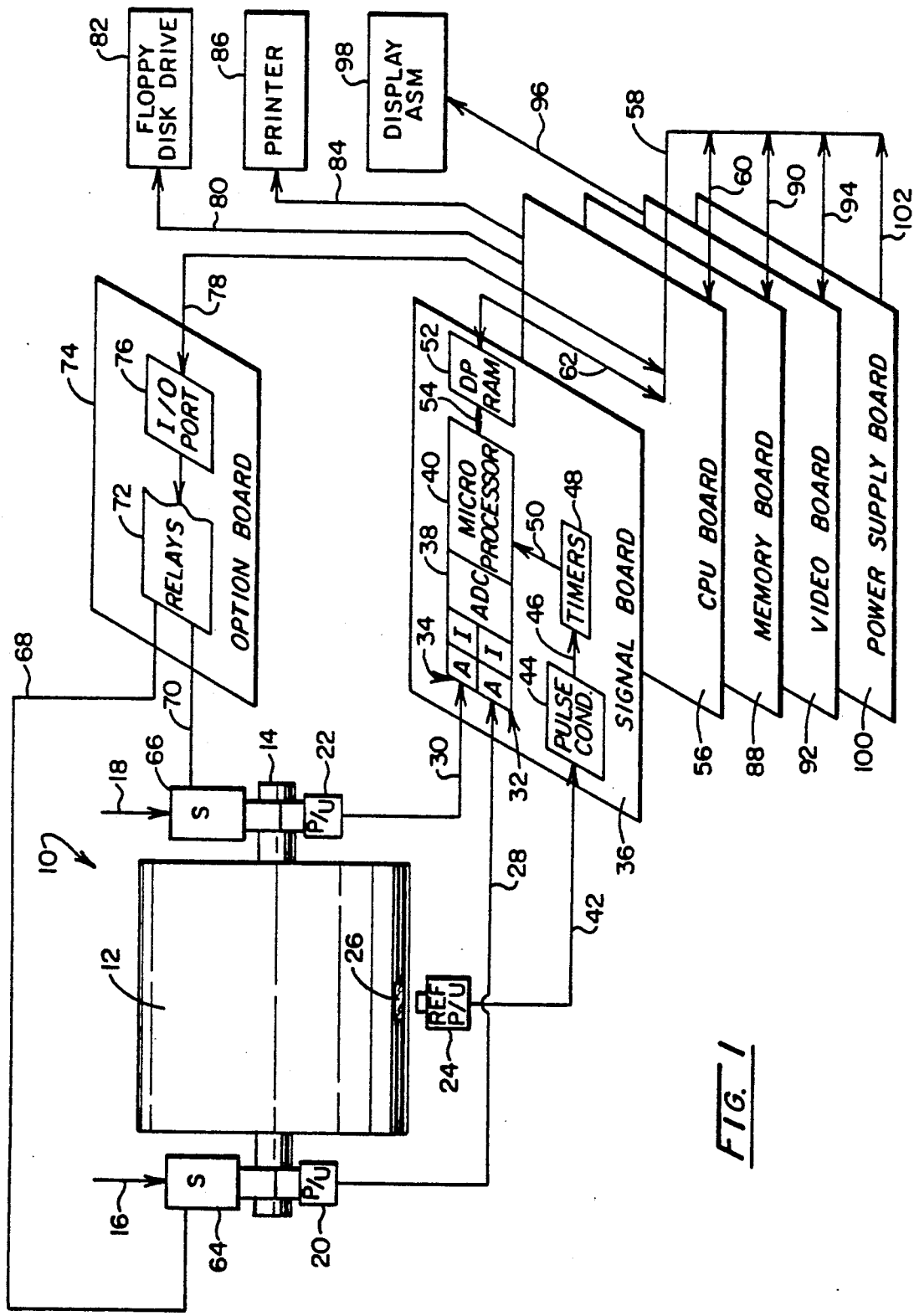
FIG. 1 is a schematic and diagrammatic representation of the apparatus of the invention shown in conjunction with a schematically portrayed rotor under balance.

The balancing apparatus of the instant invention functions to carry out rotor balancing utilizing a shaft synchronous averaging approach. Employing an AT level computational capability (CPU) for this purpose, the apparatus also utilizes a second, microprocessing capability functioning in what may be considered a direct interaction with certain of the data input and command output features of the system. Notwithstanding the extended capability for the balancing apparatus, all such features are retained within a conveniently sized housing providing such amenities as operator interfacing through a touch screen display approach. Shaft synchronous averaging is achieved by keying the system to revolving dynamics of the shaft or other suitable portion of the rotor being balanced in a substantially non-contacting manner. In this regard, it is preferred that an optical pick-up be employed such that the rotor or shaft keying inputs which are developed do not themselves affect the dynamic performance of the rotor under balance. This form of remote keying additionally will be seen to be refined through the development of incremental sampling commands or signals which are generated having a time constant or interval which is continuously updated to rotor balance rotational speed with respect to, for example, a one times revolution marker input from the optical system of monitoring.

While the apparatus and system of the invention enjoy a computational and associated memory capacity for carrying balancing both with respect to calibration "shaker" inputs and with respect to the utilization of trial weights and the like which are typically employed in field balancing, the embodiments described hereinafter look to the former approach. In this regard, reference is made to FIG. 1 wherein a schematic portrayal of the principal features of the apparatus are revealed as functionally associated with circuit mounting boards or segments and a representational rotor for balance. The latter rotor is shown generally at 10 as including a body portion 12 and associated shaft 14. Shaft 14, in turn, is is mounted at two positions or balance planes identified by arrows 16 and 18 which may for the instant embodiment, represent a "soft" bearing. In this regard, such bearings are provided so as to allow at least one degree of movement to enhance the detection of vibration at those balance planes. For the latter vibration detection, two "pick-ups" (p/u) 20 and 22 are associated with each of the respective balance plane positions 16 and 18. Devices 20 and 22 may, for example, be vibration velocity transducers, for instance, such as model 544 velocity pick-ups as marketed by IRD Mechanalysis, Inc. of Columbus, Ohio, USA.

The completion of each revolution of the rotor 10 is monitored by a non-contacting optical pick-up (REF p/u) as shown at 24 which may, for example, include a photocell type detector which responds to a small piece of reflective tape as at 26 positioned upon the body portion 12 of rotor 10. Optical reference sources as at 24 enjoy capabilities for responding to any number of light energy changes, for example, the passage of a keyway on a shaft or the like. Of importance, however, the non-obtrusive monitoring approach involved assures that the monitoring function itself does not become a balancing aspect of the system at hand. The outputs from vibration transducers 20 and 22 are represented by respective line-arrows 28 and 30 as being directed to input amplification and signal treatment stages as at 32 and 34 which are located at a circuit component 36 referred to herein as a "signal board". Stages 32 and 34 include an initial amplification stage (A) following which the signals amplified thereby are integrated at next succeeding integrating stages (I) to develop displacement signals from the velocity related signals derived from transducers 20 and 22. These amplified vibration signals as thus integrated, then are converted to digital values by an analog-to-digital converter (ADC) 38.

Actuation of the converter 38 in accordance with a predetermined sampling rate and procedure is controlled by a microprocessor represented at block 40. Microprocessor 40 may be provided, for example, as a model DMS-3FZ80 processor marketed by Digital Microsystems, Inc., which performs in conjunction with a 64K byte memory. The rotational period information derived from optical device 24 is shown being directed to the signal board 36 via line arrow 42 to a pulse condition network represented at block 44. Thus conditioned, this rotational reference signal then is directed as represented by line arrow 46 to a timing function shown at block 48, which provides incremental sampling pulse data to the microprocessor 40 as represented by line arrow 50. The latter sample pulsing is developed by, in effect, dividing the period of revolution between two succeeding reference pulses developed at opto device 24 by an even integer, which for example for ease in binary methodology, should be some power of 2, preferably 64. Thus, the vibration data for a given revolution are electronically sorted in phase defined increments by a sampling division made with respect to the previously-occurring rotation of the rotor 10. The resultant data representing 64 components are directed by this forward position microprocessor 40 to a dual port random access memory (DP RAM) represented at block 52. Interaction between the dual port RAM 52 and the microprocessor 40 is represented by the bi-directional arrow 54.

Dual port RAM 52 functions as a communicating interface between the forwardly-disposed microprocessor 40 and the analysis development computational system or computer shown in the figure as retained upon a CPU board 56. This AT level computer component as retained at the noted CPU board may, for example, be a model CAT 902 computer marketed by Diversified Technology, Inc., which incorporates, for example, a type 80286 processor performing in conjunction with RAM simulated disk drives representing a 640K-byte memory. Communication along the various boards or components of the system is provided by a bus system including a common coupling component as represented by line 58. In this regard, the common bus 58 is shown associated with the computational features of CPU board 56 via line 60 and with the dual port RAM represented at block 52 by bi-directional arrow 62.

One task assigned to the principal computer function at CPU board 56 resides in the operation of calibrating shakers for the instant embodiment. These vibrational shakers are represented at 64 and 66 and are driven, as represented by respective lines 68 and 70, by a relay assemblage as shown at block 72 which is positioned upon another component of the system referred to as an "option board" as at 74. Relays 72 are energized to carry out preliminary calibration by actuating shakers 64 and 66 by input from an I/O port communications arrangement represented at block 76 and which is shown associated with computational feature at CPU board 46 via bi-directional arrow 78. Association of the CPU board 56 computer and its simulated disk memory is represented by arrow 80 and block 82, while corresponding association between this computer function and a printer is represented by arrow 84 and block 86. The simulated disk memory for this computer at board 56 is provided by a separate memory board represented at 88 which is shown associated with the common bus connector line 58 by bi-directional arrow 90. This board 88 mounted memory may be provided as an array of semi-conductor RAM chips functioning to simulate a hard disk or the like. Video circuitry for driving a display is developed from the circuitry supported from a video board represented at 92 and associated with the common bus interconnections as represented by bi-directional arrow 94. The coupling of the circuitry of the video board 92 with a display assembly is represented by arrow 96 and block 98. Preferably, the display 98 will be provided as an A. C. plasma display, for example, produced by NEC Corporation which may be combined with a touch screen feature to facilitate operator interface with the system. For example, a type PD640G400CA-100A plasma panel may be provided with a Yamaha DISPLAYMASTER #YDM6420 interface and a CARROL TOUCH #8100-8954-01 touch panel Finally, power is supplied for the various components and at appropriate component levels by a power supply as mounted upon a power supply board 100 shown in communication with the common bus system 58 by arrow 102. A frame mounted power supply also may be employed in place of board 100.

The relative compactness and package convenience of the entire system is represented in FIG. 2. In the figure, representations of the principal components of the system indicated generally at 110 are deposited in conjunction with a phantom outline 112 of a housing. The touch screen and plasma display assembly are represented at 114, a controller for the display components being represented at 116, while the touch screen interface is represented at 118. A 3½ inch floppy disk drive is represented at 120 may be positioned over a printer 122. Printer 122 is associated with a printer interface 124, as well as a printer power supply 126. The specific power supply for the display 114 is shown at 128. The opposite half of the components within housing 112 are provided in card cage fashion, the earlier noted boards being pluggable into a passive computer bus back plane as represented at 130. In the latter regard, the principal, "AT" level computer of the system within the analysis development environment is powered from a power supply as represented at board 132 and the computer itself (CPU) is provided as a plug-in board 134. Simulated memory is mounted upon a board 136, while signal conditioning components for treating signals received from the transducers 20 and 22 (FIG. 1) are provided upon a board identified at 138. The earlier-discussed relay and input/output components as represented at option board 74 are shown provided at board 140, while, finally, the video interface components are provided in conjunction with a board 142. A conventional component cooling fan is shown at 144, while a conventional a.c. input receptacle is provided at 146 and principal power switch is shown at 148. Conventional cable connectors are represented by the array thereof at 150.

Figure 3A:
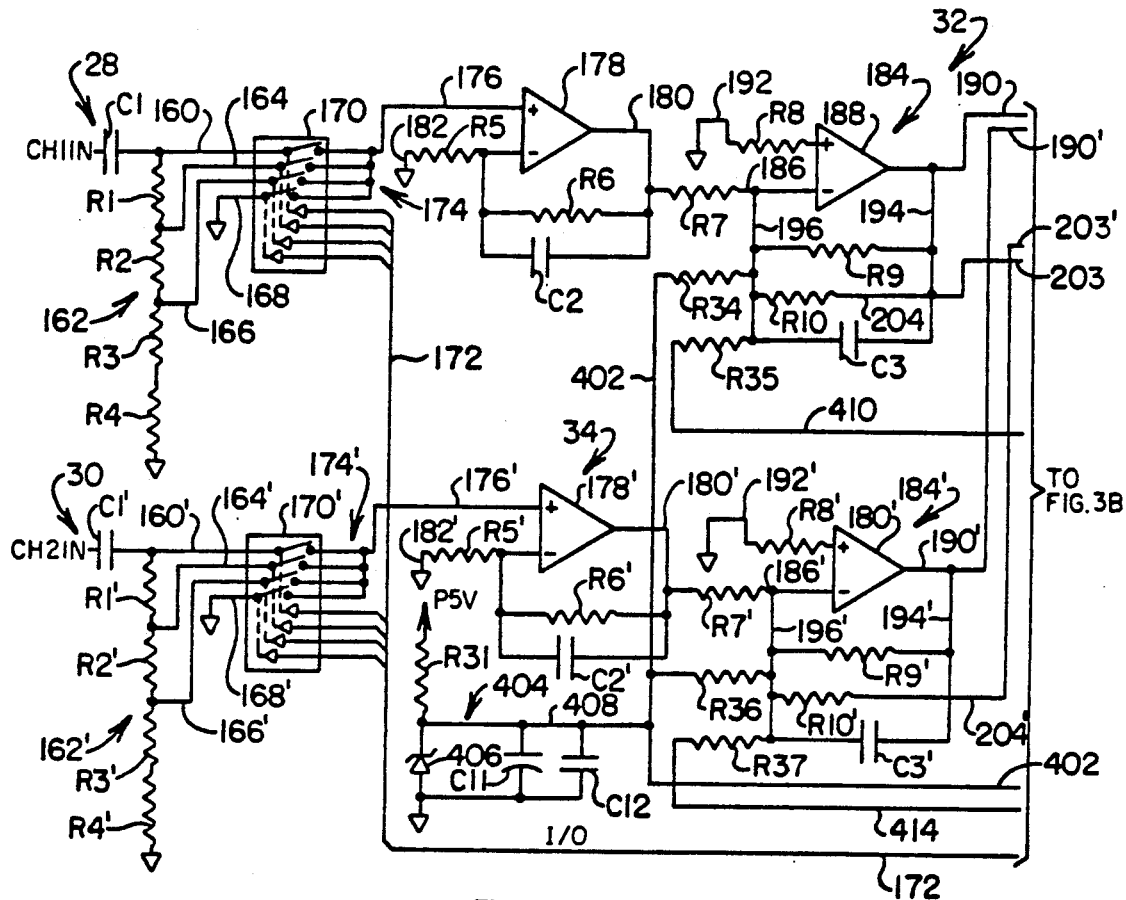
FIGS. 3A and 3B combine as labeled to provide an electrical schematic diagram of signal treating, conversion, and timing aspects of the apparatus of the invention.
Figure 3B:
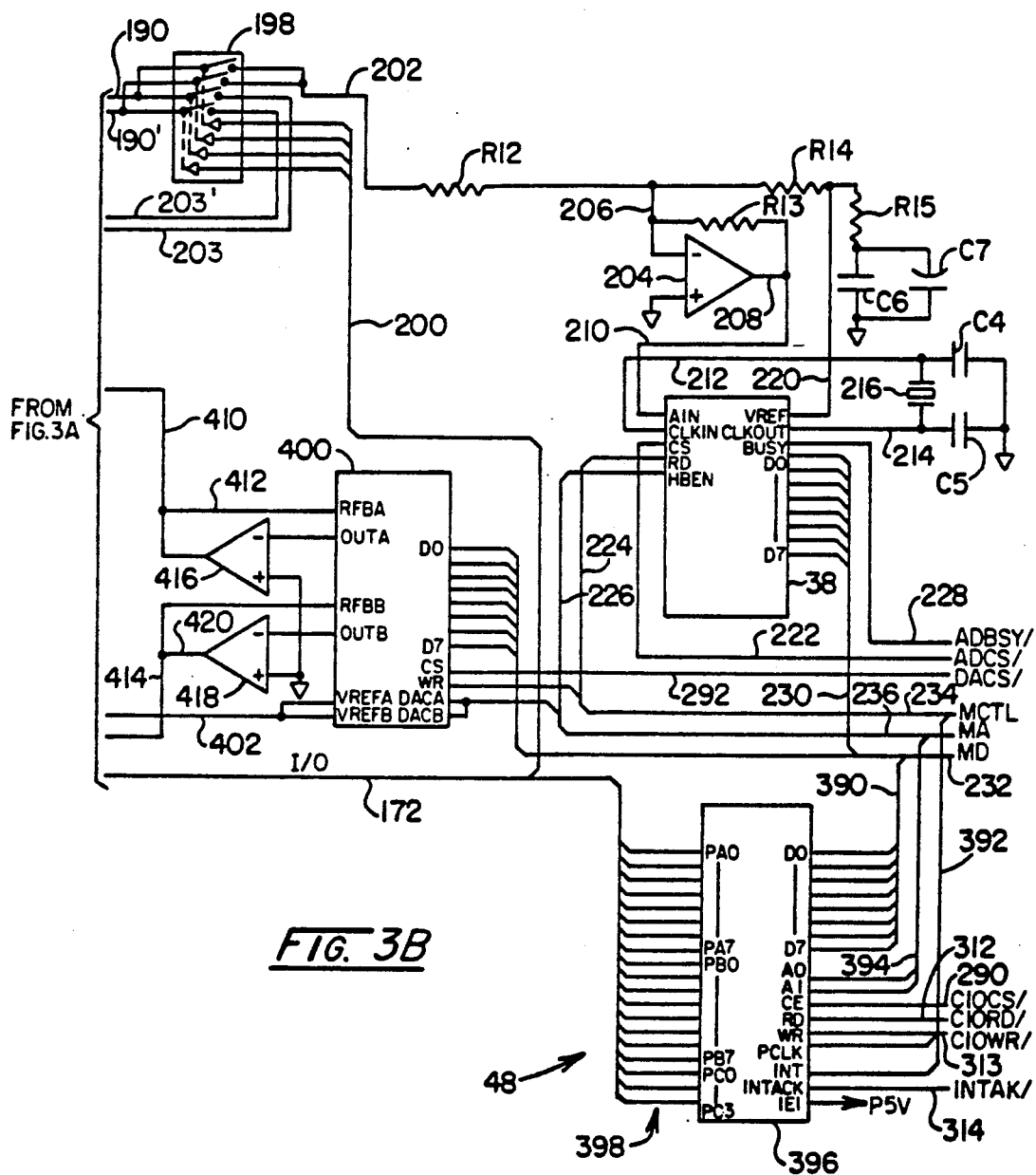

Referring to FIGS. 3A and 3B, which should be considered with respect to the adjacent orientation thereof indicated by the labeling thereon, certain components discussed in general in conjunction with signal board 36 in FIG. 1 are represented at an enhanced level of detail. In FIG. 3A, input cables representing channels carrying the vibration output signals of respective transducers 20 and 22 are represented again by the designations 28 and 30. Cable 28 is shown as a channel 1 in (CH1IN), while cable 30 is represented as a channel 2 in (CH2IN). The corresponding input amplification and signal treatment stages described at 32 and 34 in FIG. 1 again are represented in general by that same numeration. Inasmuch as these stages are identically structured, the components of stage 34 are identified by the same numerical and alphabetical designations as stage 32 with the addition of a prime. Thus, the description to follow will be concerned with channel 1 (CH1IN) but will apply correspondingly to channel 2 (CH2IN).

Vibration output signals are applied to the amplification and signal treatment stage 32 through a coupling capacitor C1 which functions to remove any offset or d.c. potentials generated by the structure of the device. The signal is then coupled into a resistor-ladder attenuator represented generally at 162 and comprised of serially-coupled resistors R1–R4. These resistors are selected having values for deriving gain ratios of ×1, ×0.1 and ×0.01. Accordingly, the resistor ladder is tapped by lines 164 and 166 which are directed to corresponding inputs of a high-speed, SPST solid-state switch 170. Switch 170 may be provided as a monolithic CMOS device comprising four independently selectable SPST switches such as a type ADG201HS marketed by Analog Devices, Inc. of Norwood, NA. Controlled by microprocessor 40 from I/O bus 172, the switch additionally functions to selectively couple analog ground into the input amplification and signal treatment stages as represented at line 168. This essentially provides a zero volts input which is utilized for offsetting. The selectively attenuated outputs from switch 170 are directed via line array 174 and line 176 to one input of a precision, low-power BiFET operational amplifier 178. The output of amplifier 178 is provided at line 180, while the opposite input thereto at line 182 incorporates a resistor R5. Line 180 extends to a feedback path incorporating resistor R6 and capacitor C2 to provide a fixed gain, for example of ×32 with a high frequency roll-off at 3.3. KHz for stability. Amplifier 178 preferably is provided as a type AD548 marketed by Analog Devices, Inc. (supra). The amplified vibration signals at line 180 are directed to an integration stage represented generally at 184 via line 186 incorporating resistor R7. Line 186, in turn, is directed to one input of an ultra-low offset voltage operational amplifier 188, the output of which is provided at line 190 and the opposite input to which is provided at line 192 incorporating resistor R8. Amplifier 188 may be provided, for example, as a type AD OP-07 marketed by Analog Devices, Inc. (supra) and its integrating configuration is developed by resistor R7 in line 186 and capacitor C3 which is located within a feedback path defined by lines 194 and 196. The integration stage converts, for example, a vibration velocity characterized signal developed by transducers 20 and 22 to a displacement categorized signal and the stage 184 also represents a single-pole low-pass filter with a d.c. gain of ×100 and a corner frequency, for example, of 0.15 Hz which, in the frequency range of 0.5 to 100 Hz, acts as an integrator deriving the noted displacement signal. Resistor R9, is interposed between feedback lines 194 and 196 to provide conventional stability for the integrator stage.

Looking to FIG. 3B, output line 190 from integrator stage 184 is seen directed along with corresponding output line 190' from stage 184' to solid-stage switch 198. Switch 198 may be provided as a high speed SPST switch which is identical to switch 170 described above. Controlled from bus branch 200 extending from bus 172, switch 198 provides for the selection of the signals at line 190 or 190' for assertion to common collecting line 202. Additionally, the switch 198 may provide for the assertion of the signals from lines 190 and 190' to corresponding lines 203 and 203' to effect the coupling of corresponding resistors R10 and R10' across the feedback path of respective stages 184 and 184'. The resistance value of resistor R10 is low, for example about 100 ohms providing for the removal of the gain of that stage during ranging procedures.

Line 202, carrying a signal which may be generally termed an "analog balance signal", here derived as a vibration displacement signal selected from switch 198, directs that signal via resistor R12 to a bipolar-offsetting amplifier 204 via line 206. A feedback path containing resistor R13 of the same value as resistor R12 is provided across operational amplifier 204 and line 208 is seen to extend via line 210 to the analog input (AIN) of an analog-to-digital converter as earlier described in connection with FIG. 1 at 38. Converter 38 may be provided, for example, as a type AD7572 high speed 12-bit analog-to-digital converter marketed, for example, by Analog Devices, Inc. The clock in (CLKIN) and clock out (CLKOUT) terminals of device 38 are coupled via respective lines 212 and 214 to a clock crystal 216 which performs in conjunction with associated capacitors C4 and C5. A reference voltage originating in device 38 is derived from line 220 extending to line 202 intermediate resistors R14 and R15 which are coupled to analog ground in conjunction with decoupling capacitors C6 and C7. The chip select (CS) terminal of device 38 is seen coupled to line 222 while the read (RD), high byte enable (HBEN) and busy terminals thereof are seen coupled with respective lines 224, 226, and 228. Analog signals asserted from line 210 to the device 38 are converted and presented along eight terminal output ports D0-D7 to bus branch 230, leading, in turn, to data bus 232. Correspondingly, line 224 is seen to be directed to control bus 234, while line 226 is seen directed to bus 236. It may be observed that bus components 232, 234, and 236 are respectively labeled MD, MCTL, and MA. These bus components are those which are associated with the microprocessor 40 and which ultimately become interactive with the central processing unit as described in conjunction with board 56 through the dual port RAM 52 as discussed in conjunction with FIG. 1.

Figure 4A:
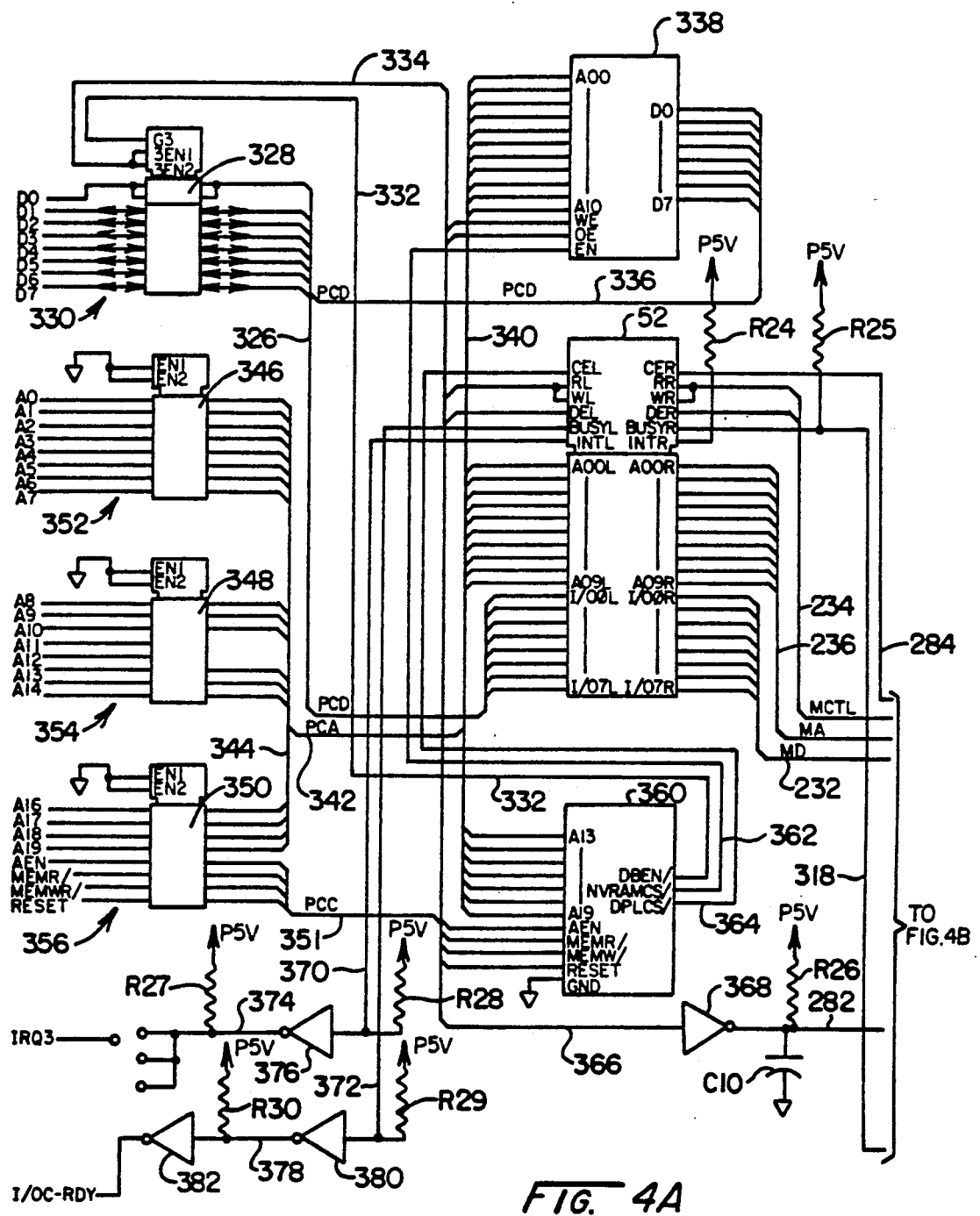
FIGS. 4A and 4B combine as labeled to provide an electrical schematic diagram of certain processing features of the invention.
Figure 4B:
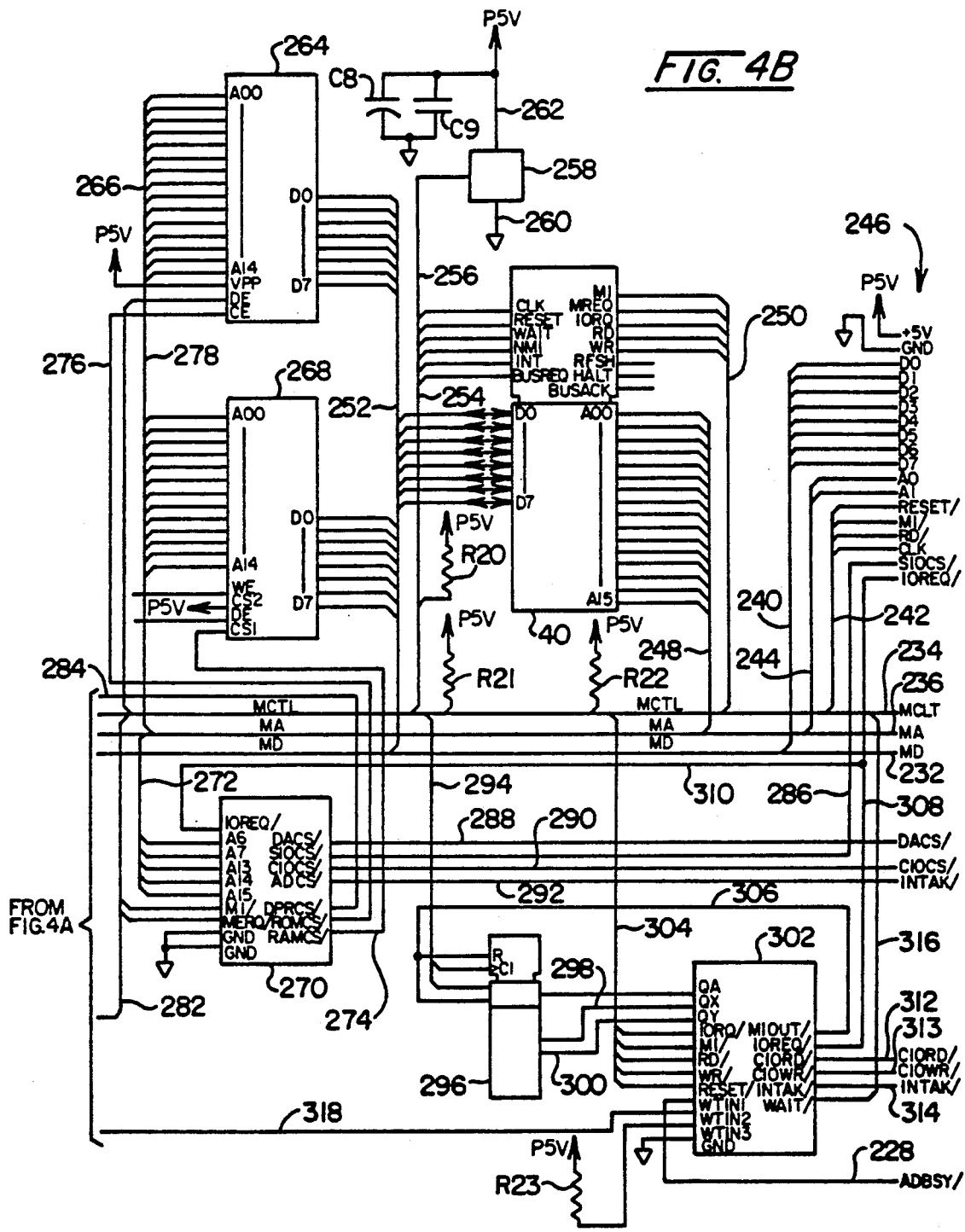

Referring to FIGS. 4A and 4B, the microprocessor 40 function and a dual port random access memory (RAM) function 52 are revealed at a higher level of detail. The figures should be considered in respective left-to-right adjacency as represented by the labeling thereon.

In FIG. 4B, bus components 232, 234, and 236 as earlier labeled are seen to extend to initial respective branch buses 240, 242, and 244 which, in turn, extend to a diagnostic port represented generally at 246. Bus 236 (MA) additionally extends via branch bus 248 to the 16 address ports A00-A15 of microprocessor 40. Device 40 may be provided, for example, as a general purpose eight-bit microprocessor, for example, as type Micro U PD7000/A-4 marketed by NEC Electronics, Inc. Bus 234 (MCTL) is seen to branch at 250 for connection to the M1, MREQ, IORQ, RD and WR terminals of device 40. While data bus (MD) 232 is seen to branch at 252 for connection with data ports D0-D7 of device 40. Similarly, bus 234 (MCTL) is seen to branch at 254 for connection with the CLK, RESET, WAIT, NMI, INT, and BUSREQ ports. Pull-up resistor R20 is seen coupled between the NMI component of bus branch 254, while pull-up resistors R21 and R22 are coupled between that supply and the respective INT and BUSREQ components of bus 234. The clock (CLK) component of branch bus 254 is seen extending at line 256 to the output of a four MHz oscillator module 258. Module 258 is seen coupled to ground via line 260 and to +5 v at line 262. Capacitors C8 and C9 are associated with device 258 for the purpose of stability.

Program data for the microprocessor 40 is derived from a 32K×8 UV erasable CMOS programmable read only memory (PROM) 264. Device 264 may be provided, for example, as a type NSC27C256 marketed by National Semi-Conductor, Inc. Data ports D0-D7 thereof are coupled to bus 252, while address ports A00-A14 are seen coupled with branch bus 266 extending from address bus (MA) 236. In similar fashion, branch bus 266 extends to the address A00-A12 input ports of an 8K×8 random access memory (RAM) 268. The data ports D0-D7 of this device are shown coupled to branch bus 252. An address decoder function is carried out in conjunction with microprocessor 40 by a programmable array logic device 270. Device 270 may be provided as a type PAL 16L8 marketed by Cypress Semi-Conductor Corp. and is address at its A6, A7, A13, A14, and A15 address ports by branch bus 272 extending from bus 236. Device 270 serves to decode or select RAM 268 via line 274 extending to the CS1 terminal of device 268. Similarly, device 270 functions to select PROM 264 at the CE terminal thereof via line 276. The enabling inputs to memories 264 and 268 are shown provided from bus branch 278. Request data are submitted to the device from bus 282 extending, in turn, to MCTL bus 234.

Selection outputs from device 270 additionally include a dual port RAM select line 284 and I/P request line 286 extending to diagnostic array 246; a digital-to-analog select signal line 288; a counter-chip select line 290; and an analog-to-digital converter select line 292.

Decoding functions additionally associated with microprocessor 40 provide for requisite wait state timing associated with a counter timer function. In this regard, branch bus 294 from control bus 234 is seen extending to the memory request and clock inputs of an eight-bit serial-in/parallel-out shift register 296. Register 296 may be provided, for example, as a type 74HCT164 marketed by National Semi-Conductor Corp. The fourth and seventh stage outputs of the device are tapped by respective lines 298 and 300 to provide a timing input to the QX and QY input ports of a programmable array logic device (PAL) 302. Device 302 may be provided, for example, as a type PAL1618 in similar fashion as device 270. The IORQ/; M1/; RD/; WR/; and RESET/ terminals of device 302 are coupled by branch bus 304 with the control bus 234 while the wait (WTIN1) terminal thereof is coupled for receiving an analog-to-digital busy signal from line 228. The corresponding WTIN3 terminal is seen coupled through pull-up resistor R23 to +5 v supply. The M1OUT/ terminal of device 302 is coupled via line 306 to the clear input terminal of shift register 296, while the IOREQ/ terminal thereof is coupled via lines 308 and 310 with the corresponding terminal of device 270. The counter timer READ, WRITE, and INTERRUPT acknowledge command signals are provided at respective lines 312, 313, and 314, while the WAIT/ terminal thereof is coupled by line 316 to control bus 234. A second wait input terminal of the device (WTIN2) is seen coupled to line 318 which is directed to a BUSY terminal of dual port RAM 52.

Turning now to FIG. 4A, dual port RAM 52 provides two independent ports, "L" and "R" with separate control, address and I/O pins that permit independent, asynchronous access for reads or writes to any location in memory. A dual port form of RAM as at 52 permits microprocessor 40 to access common memory space with the CPU computer associated with board 56 (FIG. 1). The device may be provided, for example, as a type IDT 7130L marketed by Integrated Device Technology, Inc. RAM 52 is seen to be addressed on its "right" (R) side through address ports A0–A9 from bus 236 and at its IO0R–IO7R ports from microprocessor data bus 232. The unused right port interrupt terminal (INTR) is seen coupled through pull-up resistor R24 to +5 v supply and the busy output flag (BUSYR) additionally is coupled through such a pull-up resistor R25 to +5 v supply. It may be observed that the busy flag output is directed along line 318 to the right interrupt 2 (WTIN2) terminal of device 302 (FIG. 4B).

The opposite or left port of device 52 is seen to be arranged such that its IO0L–IO7L ports are coupled to a data bus 326 associated with the CPU board 56 and labeled "PCD". Bus 326 is seen to extend to one side of an octal bus transceiver 328. Device 328 may be provided as a type 74ACT245 and functions to allow synchronous two-way communications between two data buses, i.e. the PCD bus 326 and the corresponding data bus of the AT level computer (CPU) associated with board 56. In this regard, data bus couplings from the latter AT level computer are shown at the D0–D7 array represented generally at 330. Device 328 is enabled from line 332 and the direction of data flow is controlled from bus 334 extending to the EN1 and EN2 ports thereof. When the signal at bus 334 is low, data flows from array 330 to bus 326 and vice versa in the presence of a signal of opposite logic.

Data bus 326 extends to a branch bus 336 which extends, in turn, to the D0–D7 terminals of a non-volatile random access memory (NVRAM) 338. Address ports A00–A10 of device 338 are accessed from an address bus (PCA) 340 which is seen to extend via branches 342 and 344 to one side each of three tri-state buffers 346, 348, and 350. Provided, for example, as type MN74HCT244 octal tri-state buffers marketed by National Semi-Conductor Corp., the opposite inputs to the devices are coupled with the corresponding AT level computer of the apparatus as represented at address terminals A0 through A19 at terminal array 352, 354, and 356.

Device 338 may be provided as a 16K non-volatile static RAM organized as 2048 words by eight bits. This non-volatile memory has a self-contained lithium energy source and control circuit which constantly monitors the system supply for an out-of-tolerance condition. The lithium energy source automatically is switched on and write protection is enabled in the event of the latter condition. Access is provided to this device only from the AT level computer or CPU. The memory 338 contains configuration and set-up data unique to repeating job conditions.

Control from the CPU or AT level computer is asserted at the address enable (AEN) memory read and write (MEMR/, MEMW/) and reset terminals at array 356 extending to buffer 350. These corresponding outputs are directed by control bus (PCC) 351 extending, in turn, to corresponding terminals of a decoder 360. Device 360 may be provided as a programmable array logic device similar to components 270 and 302 (FIG. 4B) and provides control outputs such as earlier noted line 326 directed to the interrupt left input of dual port RAM 52. Additionally, a non-volatile RAM chip select (NVRAMCS/) signal is provided at line 362 which is directed, in turn, to the enable input (EN) of RAM 338. Finally, a dual port RAM 52 chip enable left input is provided from device 360 via line 364. Additional controls are asserted from bus 351 as represented at branch 334 thereof extending, for example, to the read, write, and enable inputs for the left side of dual port RAM 52, as well as to the write enable and output enable terminals of non-volatile RAM 338. Address bus 340 (PCA) additionally is seen directed to the A13–A19 input terminals of device 360. One lead at line 366 extending from control bus 334 is seen extending through an inverter-buffer 368 to earlier-described line 282 and serves to carry out a reset function for the components of the circuitry associated with microprocessor 40. A pull-up resistor R26 is coupled with 5 v supply and line 282 extending from the output of buffer 368. Similarly, a capacitor C10 is coupled from line 280 to ground.

Communication from the left categorized side of dual port RAM 52 and the AT level computer (CPU) is provided from the busy left and interrupt ports via respective lines 370 and 372. Line 370, carrying the interrupt left signal is directed to line 374 which is shown coupled to 5 v supply through pull-up resistors R27 and R28 on either side of a buffer 376. Line 374 is seen to be identified as carrying an IRQ signal for assertion to the CPU. In similar fashion, line 372 carrying the busy left signal is directed to line 378 incorporating two buffers 380 and 382. Line 378 additionally is coupled to +5 v supply via two pull-up resistors R29 and R30 and is seen to carry an I/O channel ready signal. Buffers 368, 376, 380, and 382 may be provided, for example, as type 74HCT05.

OFFSET CANCELLATION

Among the functions of microprocessor 40 is the carrying out of an offset cancellation procedure. This procedure, for example, may be carried out at each power up as well as periodically during testing, for example, every 10 minutes. Returning to FIG. 3B, control instructions for carrying out nulling are provided from microprocessor 40 from its system buses 232, 234 and 236. These buses are seen to be coupled through respective branch buses 390, 392 and 394 to data ports D0–D7, address ports A0 and A1, and control ports CE, RD, WR, and PCLK of a counter/timer and parallel I/O unit (CIO) 396. Unit 396 is a general-purpose peripheral circuit for providing generally encountered counter-timer and parallel I/O requirements for systems design. The device contains three I/O ports and three counter/timers. Such devices are marketed, for example, as type Z8536 by Zilog, Inc. The A, B and C output ports of device 396 are shown at array 398 leading to earlier-noted I/O bus 172. This unit forms the function described earlier in conjunction with FIG. 1 at 48. At the commencement of nulling, the noted bus 172 is employed for actuating solid-state switches 170 to apply a standard signal value such as ground or predetermined 0 level signal values, such as a zero by such ground to the input amplification and signal treatment stages 32 and 34. This nulling or zero level signal is applied following a delay, for example of two seconds. Such delay permits circuit stabilization. The signals which may result from the null input then are applied from switch 198 seriatim by channel to analog-to-digital converter 38 and the resultant digital value of offset voltage (digital offset voltage) is read by the microprocessor 40 and compared with limit values. A correcting offset value then is transmitted to the data input terminals D0-D7 of a dual eight-bit buffer multiplying digital-to-analog converter (DAC) 400. Device 400 includes control logic in addition to a dual channel conversion arrangement, each channel containing a sequence or ladder structure of resistances. The device may be provided, for example, as a type AD7528 marketed by Analog Devices, Inc. Control inputs to device 400 include a chip select input from line 292 and a channel selection from bus 236. A 2.5 volt external reference is asserted to device 400 for each channel from line 402 which is seen to extend (FIG. 3A) to a reference supply represented generally at 404 which is comprised of a Zener diode 406 and resistor R31 connected between 5 v supply and ground. Stabilizing capacitors C11 and C12 also are provided such that a stable 2.5 v reference is developed at line 408 which is, in turn, coupled to line 402. Line 402 also is seen to be directed through resistor R34. Current directed positively through resistor R34 creates a negative output for amplifier 138. That negative offset at amplifier 188 can be modified by the DAC 400 by means of current directed negatively through resistor R35 within line 410. For example, a zero level signal from DAC 400 derives more negative offset at amplifier 188 than the anticipated maximum d.c. offset signal term. A full signal from DAC 400 (a negative voltage) generates more positive offset at amplifier 188 than the anticipated maximum d.c. offset signal term. The dual channel or two part DAC 400 is controllable by microprocessor 40 in 256 steps, each step providing 0.0215 volt at the output of amplifier 188. In similar fashion, for channel 30, at stage 34, the same form of offset signal is seen to be developed through resistor R36 and resistor R37 extending via line 414 to the other half of DAC 400. The correcting offset value or D.C. displacement signal developed by the comparisons carried out by microprocessor 40 are asserted for channel 28 through buffer 416 and line 410 and for channel 30 through buffer 418 and lines 420 and 414. The procedure is iterative, being carried out until the offset falls within acceptable limits. The offset applied by the DAC under control of the microprocessor is an amount equal and opposite that measured during application of the nulling or zero level signal to the input. Repeated zero application, measurement, and DAC control reduces offset to acceptable values (under ±0.050 volt).

Turning momentarily to FIG. 5, the general instructional procedure for carrying out the noted offset routine is portrayed in flow chart fashion. Looking to the figure, the routine starts as represented at node 424 with the generation, for example, of power-up as represented at block 426. With such power-up, the microprocessor 40 commands the solid-state switches 170 to introduce analog ground (AGND) from line 167. This command is represented at block 428. A delay then ensues as represented at block 430 determining whether two seconds have expired. In the event that they have not, then as represented by loop line 432, the routine delays. Upon the determination of an affirmative response to the inquiry at block 430, then, as represented at block 434, the analog-to-digital converter 38 is enabled to provide a digital offset voltage reading (DOV). The program then evaluates that reading as represented at block 436 to determine whether or not to transmit the value to the DAC 400. If the value is transmitted, as represented at block 438, then the DAC 400 applies a value equal and opposite to the value measured at block 434. The process of measuring and applying an offset continues as represented by loop line 440 until the DOV is less than 50 mV. When that condition occurs, the routine returns as represented at block 442. The program similarly offsets channel 30 except that switch 170' is grounded initially.

RANGING PROCEDURE

Figure 6:
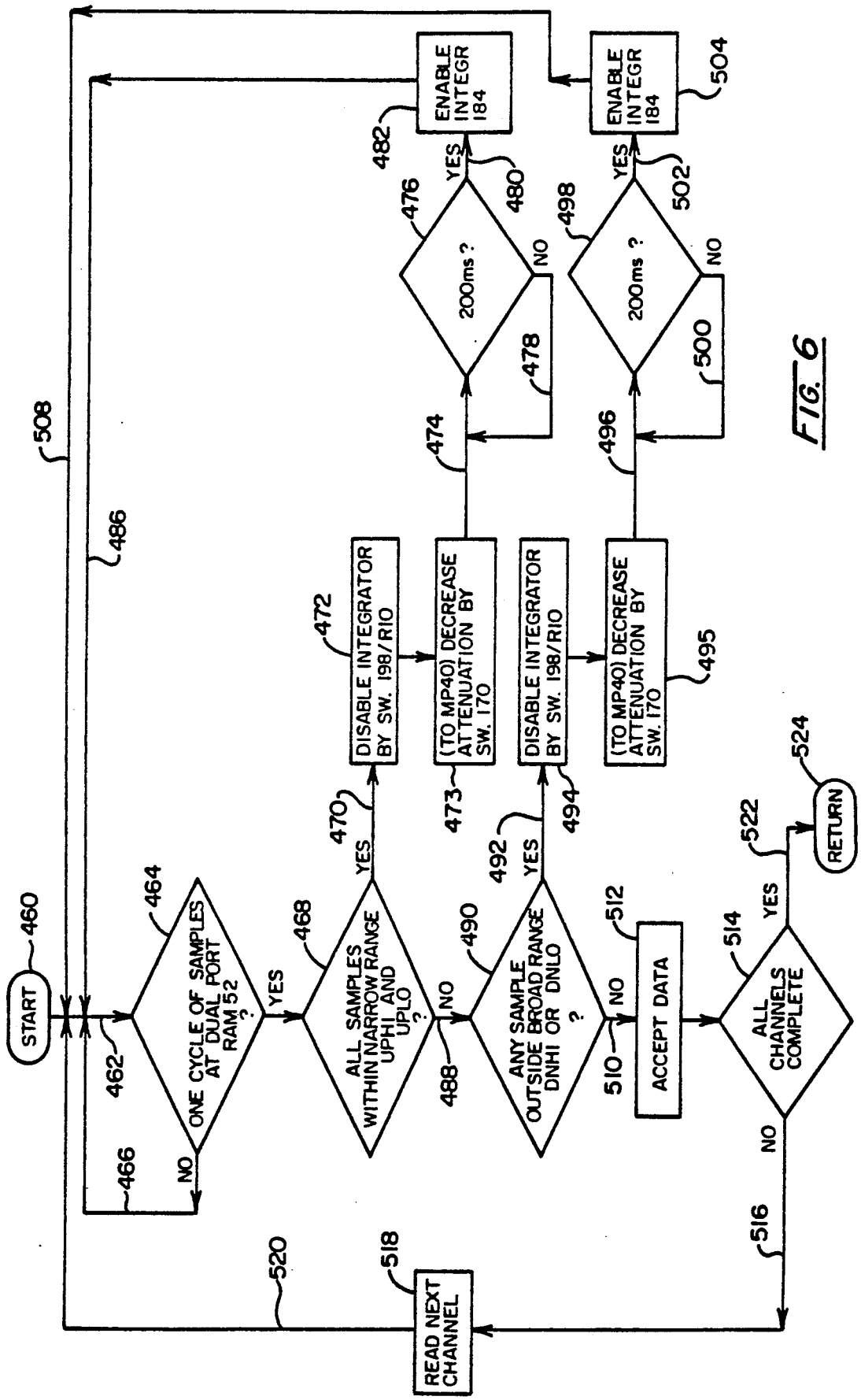
FIG. 6 is a flow diagrammatic representation of a ranging technique applied with the invention.

The adjustment of range through the actuation of switches 170 to effect attenuation or select gain with respect to resistance ladders R1, R4 is intended to ensure that the analog-to-digital converter 38 always receives the largest possible displacement signal generated by the input amplification and signal treatment stages which is appropriate to the conditions at hand, without saturating, i.e. exceeding +/−2.5 v input or the equivalent thereof depending upon the components utilized. Any necessity to change the gain through actuation of switch 170 is determined by the CPU or AT level computer at CPU board 56 (FIG. 1). The necessity to change the gain is determined by the latter computer from its incoming data and the mode of operation which it may be in. Execution of the change in gain is carried out by instructions from the CPU to the microprocessor 40. Referring to FIG. 6, the ranging procedure is illustrated in flow diagrammatic fashion, commencing with start node 460 and proceeding, as represented by line 462 to the inquiry depicted at block 464. In general, numerical data for a complete revolution between optical reference pulses is evaluated upon being submitted to dual port RAM 52 (FIG. 4A). As described in connection with block 464, a determination is made with respect to those data as to whether a complete cycle of samples, i.e. 64, has been located at dual port RAM 52. In the event that data representing such a complete cycle is not present, then as represented by loop line 466 extending to line 462, the system awaits such data. In the event of an affirmative response to the inquiry at block 464, then as represented at block 468 a determination is made as to whether all samples fall within a narrow range which is established as less than "UpHi" and greater than "UpLo". Exemplary values for these range limits may, for example, be the digital equivalent of about 2.6 v for UpHi and about 2.4 v for UpLo. Note that all samples for the revolution without exclusion, are considered for this test. In the event of an affirmative response, then as represented at line 470 and block 472, switching functions 198 are actuated to effect the insertion of resistors R10 in the feedback paths of integrator stages 184 in order to shorten the transient settling time. Then, as represented at block 473, signal attenuation is decreased by switch 170 to increase usage of available dynamic range. The insertion of resistor R10 into the integrator feedback is carried out inasmuch as when the attenuating arrangement through switches 170 is activated while switched, large temporary offsets in the integration signals can be developed. It is desirable to minimize these offsets and to permit them to settle out quickly so that the analog-to-digital converter 38 may read valid data. Accordingly, as represented at line 474 and block 476, a 200 ms dwell occurs as represented by loop line 478 determining whether or not a 200 ms interval has occurred. Following that interval, as represented at line 480 and block 482, integrators 184 are enabled. The program then continues as represented at line 486. In the event that all samples are not within the narrow range as represented at block 468, then as indicated by line 488 and represented at block 490, a determination is made as to whether any sample of a given revolution or cycle of sampled displacement measurements has a value greater than a DnHi or less than a DnLo. If that is the case, then a next lower gain range is established by switch 170. Exemplary values for these range limits may, for example, be the digital equivalent of about 4.5 v for DnHi and about 0.5 v for DnLo. In the event of an affirmative determination with respect to block 490, as represented at line 492, and block 494, the integrator stage 184 again is disabled by activation of switch 198 to insert resistor R10 in its feedback path just before making the attenuation change and a next lower gain range is established as represented at block 495. The program then is seen, as represented at line 496 and block 498, to determine whether a settling interval of 200 ms has occurred as represented by loop line 500. In the event that it has, then, as represented by line 502 and block 504, the integrator stage 184 is enabled. The program then, as represented at line 508, reverts to a re-evaluation. In the event of a negative determination to the inquiry at block 490, then as represented at line 510 and block 512, the data are accepted and, as represented at block 514, a determination is made as to whether evaluation for all channels is complete. In the event that it is not, as represented at line 516 and block 518, the next channel is read and the program returns to re-evaluation as at line 462 as represented at line 520. When all channels have been completed, then as represented at line 522 and node 524, the program returns.

Turning to FIG. 7, components of the instant system which may be considered associated with the option board 74 as discussed in FIG. 1 are revealed at an enhanced level of detail. As described in conjunction with line 78 therein, the CPU or AT level computer communicates with this board as represented in FIG. 7 by bus data inputs as represented at array 536 as well as bus address information as represented, in part, at array 538 and at array 540. The latter array also includes control instruction inputs AEN, IOR/, IOW/, CLK, RESET, and ALE. Arrays 538 and 540 are seen directed to the inputs of respective tri-state buffers 542 and 544. Buffers 542 and 544 may be provided, for example, as the earlier-noted type MM74HCT 244 marketed by National Semi-Conductor Corp. A four line array 546 and five line array 548 from respective buffers 542 and 544 are seen directed to the input of a programmable and erasable logic array device 550. Device 550 may be provided as a PAL16L8 (supra) and is seen to respond to an IOR/ in put as well as to provide a DBEN/ output at line 552.

Bus array 536 is seen to be directed to one side of an octal bus transeiver 554, the output of which at array 556 is directed to a bus 558(D). Line 560 extending thereto carrying the DBEN/ input from line 552 provides an enablement for buffer 554, while line 562 carrying the IOR/ signal from an output of array 548 serves to select the direction of data flow.

To provide for drive to the relays at 72 activating shakers 64 and 66 (FIG. 1) conventional power supplies at either 50 or 60 Hz depending upon locale are tapped and suitably transformed at the board 74 for the purpose of employing the line frequencies thereof. These frequencies are applied, as represented at FIG. 7 to line 564 and asserted through the input resistor R38 of a clamping circuit represented generally at 566. Circuit 566 is seen to include Zener diode 568, diode 570, and capacitor C15 in association with a Schmitt trigger 572. The latter trigger may be provided, for example, as a type 74HCT14. The output of trigger 572 and line 574 is directed to one input of a decade ripple counter 576. Counter 576 can be configured to divide, for example, by 2 or 5 and may be provided, for example, as a type 74HCT390 marketed by Signetics, Inc. Line 578 extending to the device couples with the divide by 5 output and is seen directed to the 60 Hz designated input port of a four-input multiplexer 580. Thus, where a 60 Hz input is provide at line 564, the output at line 578 will be a division thereof by 5 or 12 Hz. On the other hand, output line 582 from device 576 represents a division by two which is directed to an input of a next decade ripple counter 584 which functions to carry out another division by two to provide, at line 586, a division of any 50 Hz signal asserted at line 564, thus providing a generally equivalent shaker reference signal. The output of multiplexer 580 is provided at line 588 labeled "MUX REF".

The selection of an appropriate relay 72, designated "right" or "left" for driving shakers 64 and 66 is initially developed at a 3-to-8 line decoder 590 which receives a binary three line logic input at array 592 from tristage buffer 542 and is enabled from earlier-described line 552 emanating from decoder 550. The two line outputs from device 590 are provided at lines 594 and 596 which are directed to respective Schmitt triggers 598 and 600. Decoder 590 may be provided, for example, as a type 74HC138 marketed by Signetics, Inc., while Schmitt triggers 598 and 600 may be provided, for example, as type 74HCT14. Outputs of triggers 598 and 600 are provided, respectively, at lines 602 and 604 which are directed to the inputs of a bi-stable transparent latch 606 along with inputs (D0 and D1) from bus 558. Latch 606 may be provided for example, as a type 74HCT75 marketed by Signetics, Inc. Output lines 608 and 610 of latch 606 are directed to the logic selection input ports of multiplexer 580 to elect the outputs from input lines 586, 578, or an opto reference input at line 612. Lines 614 and 616 from latch 606 are seen directed to the inputs of a buffer/line driver 618 which may be provided, for example, as a type 74HCT368 marketed by Signetics, Inc. Driver 618 provides a left relay drive enable signal at line 620 and a corresponding right relay drive enabling signal at line 622.

SAMPLE PULSE DERIVATION

The vibration signals developed from pick-ups 20 and 22 (FIG. 1) and which are amplified and subjected to signal treatment to develop displacement related vibration signals are sampled with respect to a given number, N, of sampling increments for each revolution or period, T, of the shaft 14 of the rotor 10 being balanced. The development of these N increment sample pulses for each revolution is done electronically and without the coupling of an incrementing device to the shaft itself. Only the opto derived reference pulse representing, for example, a single revolution of rotor 10 is used with the system and that use is for the purpose of synchronization and for continually adjusting the N-sampling increment interval, with respect to any deviations in rotor speed. In general operation, when the performance of microprocessor 40 is "locked on" or in acceptable synchronization with shaft 14 rotation, it provides a signal to the CPU or AT level computer of that fact and commences collecting data by reading the transducer channels every sample pulse. Data are accumulated at the dual port RAM 52 and the CPU is responsible for checking these raw data for correct range, and for running the fundamental extraction routine or synchronous averaging filter function which serves to separate the fundamental signal from noise in conventional fashion. At such time as the CPU or AT level computer determines a necessity to change gain or determines that the time has arisen to check offsets as discussed above, a suitable command is directed to microprocessor 40 which carries out such a function. Data collection stops during the above-noted ranging and offsetting procedures.

Figure 8:
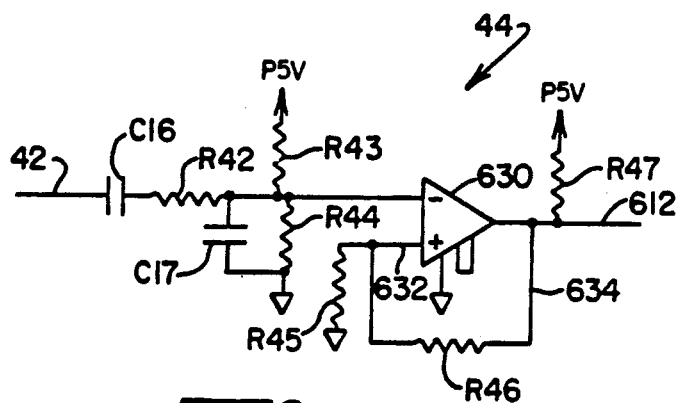
FIG. 8 is an electrical schematic diagram of a clamping circuit employed with the optical reference components of the invention.

Looking in particular to the derivation of the reference pulse and its treatment, reference is made to FIG. 8 where line 42 again is reproduced as in FIG. 1 carrying a reference signal defining the period of revolution, T, to a pulse conditioning network represented generally at 44. Network 44 incorporates a coupling capacitor C16 following which resistor R42 and capacitor C17 form an attenuating function. Resistors R43 and R44 coupled respectively with +5 supply and ground function to set the d.c. level based on power supply and line 42 then is seen to be directed to the input of a voltage comparator 630 which may be provided, for example, as at type LN311. The opposite input to comparator 630 is coupled via line 632 and resistor R45 to ground, while the output thereof is earlier described at line 612 (FIG. 7). A feedback path defined by line 634 and resistor R46 serves to improve transition speed for the hysteresis developed at line 612. Returning to FIG. 7, line 612 is seen to be selectable by multiplexer 580 to provide an output at line 588 (MUX REF) and this output is directed by microprocessor 40, for example, to the PB2 input of counter/timer 396 as described in conjunction with FIG. 3B via the bus network.

Returning to FIG. 3B, it may be recalled that the counter/timer 396 is configured having three independent 16-bit counter/timers, each having up to four external access lines and three output duty cycles which are programmable as retriggerable or non-retriggerable. Two of these counters are used for the purpose of developing the N sample pulses for a period of revolution, T, of the rotating body under balance. Because a period of revolution initially must be measured to determine the time constant or duration for each sample pulse, the evaluation of that time constant, perforce, will be at least one revolution or period delayed. In effect, the counters are employed to periodically update the sample pulse time constant or duration to achieve a form of phase lock within acceptable tolerances. With the arrangement, the electronic system may adequately track the speed of the rotating body. A key to the technique developed resides in the recognition that two instant interrupts cannot occur with any consistency. For purposes of the discussion to follow, only two of the three counters available with device 396 are employed. For the purpose of counting and timing, the microprocessor clock is employed to, in effect, assert a 2 MHz clock timing pulse to the PCLK terminal input of device 396.

Of the two counter timers, (CT2, CT3) counter timer CT2 responds or is actuated to commence counting by receipt of the marker or reference signal pulse. Counter/timer CT3 functions continuously and serves to generate the increment sample pulses by which the actuation of sampling analog-to-digital converter 38 is carried out. Ideally, N sample pulses representing an even integer power of 2 will be generated for each period of revolution of body 10. Preferably, the value of N is set at 64. Counter/timer CT2 serves, in response to a reference or marker pulse, to measure the time from that reference pulse to a next following sample pulse generated by counter/timer CT3. Counter/timer CT2 does not generate an interrupt.

Referring to FIG. 9, a technique by which the duration for each of N pulses is developed is diagrammatically portrayed. In the figure, reference markers or signals are identified by the vertical line designations $R_0$ and $R_1$. Between these successive reference pulses there then exists the period of revolution of the device 10 which is identified as: RPERIOD. The sampling pulses for actuating converter 38 are represented at time line 650 as having an interval tc3, the number of sampling pulses being reduced in the diagram in the interest of clarity. It may be observed that, following the occurrence of reference pulse $R_0$ a tc3 pulse occurs as represented at 652. The occurrence of this pulse is at a TIME0 from the occurrence of reference pulse $R_0$. Following the occurrence of the next reference pulse $R_1$ another sampling pulse, tc3 typically will occur as represented at 654 and this sampling pulse will occur at a TIME1 from the occurrence of that next reference pulse, $R_1$. The time interval between tc3 pulses 652 and 654 is represented in the diagram as RTIME which is equivalent to $N \times tc3$, where N are the number of pulses as counted by microprocessor 40. Correspondingly, the value of RPERIOD may be stated as follows:

RPERIOD=RTIME+TIME0−TIME1

To compute the interval tc3, i.e. the interval between sampling pulses for a subsequent revolution of the rotor 10, the value RPERIOD is divided by N.

Considering a condition wherein the value, N, is set at 64, if there have been 64 sample pulses between the reference pulses, then the time from the first sample pulse after the second reference pulse to the next reference pulse is:

RPERIOD−TIME1 and the new sample time constant (SPERIOD) is:

SPERIOD=(RPERIOD−TIME1)/64

If there have been 65 sample pulses between the reference pulses, then the time from the first sample pulse before the second reference pulse to the next reference pulse is:

RPERIOD−TIME1+SPERIOD(old)

and the new sample time constant is:

SPERIOD=(RPERIOD−TIME1+SPERIOD-(old)64

In general, in the overall program for applying this procedure, the routine branches to a first address which tests counter/timer CT2 for a marker or pulse trigger, i.e. a reference signal. If a reference signal has been detected, the counter/timer CT2 is stopped and the routine reverts to a next branch which reads counter/timer CT2 and requests the system to compute the new time constant. A next branch address then provides for setting the counter/timer CT3 time constant under the conditions above set forth. The next branch address then sets up counter/timer CT2 for triggering or to start counting on the next occurring reference pulse. The procedure then reverts to the above first branching step.

Figure 10:
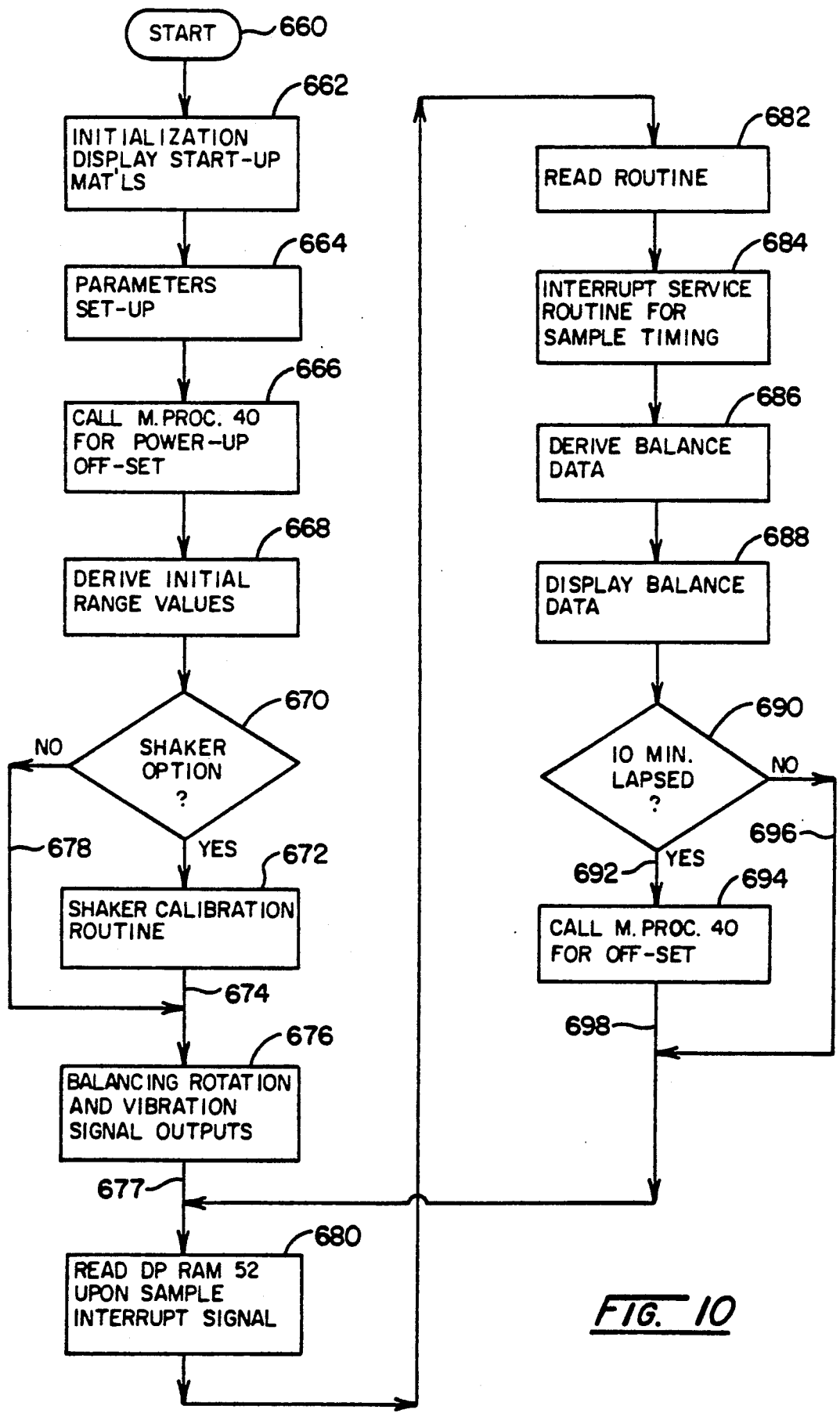
FIG. 10 is a flow diagram revealing the general operation of a computer (CPU) employed with the apparatus of the invention.

Turning to FIG. 10, an overall program under which the CPU or AT level computer of the system performs is represented in flow diagrammatic fashion. This program commences at node 660 and commences to the instructions as represented in block 662 providing for conventional initialization, as well as display of start-up materials or information. The latter displays provide prompting information and the like for aiding the operator in initial set-up procedures. As noted earlier herein, a touch screen approach can be employed by the program for such purposes and is utilized throughout the program in order to facilitate a user friendly approach to balancing. The program then continues as represented at block 664 with the setting up of parameters, including where necessary, the withdrawing of data from non-volatile RAM 338 and the provision over any requirements to the signal treatment procedures at 32 and 34.

The program then continues as represented at block 666 wherein the microprocessor 40 is called for an initial power-up offset routine as described above in connection with FIG. 5. Following the development of appropriate offset corrections, as represented at block 668, the program develops initial range values drawn either from non-volatile memory or through the assertion of predetermined first range level values. The program then proceeds as represented at block 670 to determine whether a shaker option is in place. In this regard, the determination is made as to whether shaker devices as at 64 and 66 (FIG. 1) are in place for calibration procedures as opposed to utilizing a trial weight type balancing procedure. In the event that the option is in place, then as represented at block 672, a shaker calibration routine as is conventional in the art is carried out. The program then proceeds as represented at line 674 and block 676 to carry out balancing rotation of the rotor under balance and development of vibration signal outputs. Returning to block 670, in the event the shaker option is not present, then as represented at line 678 leading to line 674, a trial weight balancing approach is employed by the program and the program proceeds as represented at earlier-noted block 676. As vibration signal outputs are generated, the program proceeds to read the dual port RAM 52 in accordance with the sampling routines as represented at block 680. Essentially occurring with the reading of dual port RAM 52, as represented at block 682, the ranging routine as described in conjunction with FIG. 6 is carried out as well as the interrupt service routine for sample timing as represented at block 684. Balance data are derived by the system as the above process ensues as represented at block 686 and balance data are displayed at display output display assembly 114 as represented at block 688. A determination is made to monitor for the elapse of 10 minutes of operation as represented at block 690. In the event that 10 minutes has elapsed, then as represented at line 692 and block 694, the microprocessor 40 is called to carry out an offset routine. Where 10 minutes has not elapsed, then as represented at lines 696 and 698 the program returns to line 677 and carries out a reading of dual port RAM 52 upon the occurrence of the next occurring sample interrupt signal.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. In a system for deriving balance data of a variety wherein a rotating body to be balanced is rotated at rates providing a period T for each complete revolution, wherein a transducer is provided for select balance planes which derives corresponding vibration output signals, the improved balance analysis apparatus, comprising:
    a reference device responsive to said rotating body for deriving a reference signal with respect to the revolution thereof in correspondence with each said period, T;
    signal treatment staging responsive to said vibration output signals for deriving analog balance signals in correspondence therewith;
    counter-timer means responsive to a control input for generating a sequence of a predetermined number, N, of increment sample pulses of select duration;
    a converter actuable to convert said analog balance signals to digital values; and
    a process control responsive to said reference signal with respect to a given revolution of said rotating body for deriving the value of select duration of said increment sample pulses as said control input to said counter-timer means, said select duration substantially corresponding with the value T/N, said process control effecting said actuation of said converter in correspondence with said increment sample pulses during a revolution of said rotating body subsequent to said given revolution to effect derivation of said digital values and for generating said balance data therefrom.

2. The balancing apparatus of claim 1 in which said predetermined number, N, is an even integer power of 2.

3. The balancing apparatus of claim 2 in which said number, N, has a value of 64.

4. The balancing apparatus of claim 1 in which:
    said counter-timer means includes a first counter-timer responsive to each said reference signal to commence count timing and derive a first count value therebetween, and a second counter-timer substantially continuously carrying out count timing having second count values deriving said increment sample pulses at said select duration and responsive to said control input for adjusting said select duration; and
    said process control is responsive to said first counter-timer first count value, and to said second count values representing increment sample pulses next occurring subsequent to each said reference signal for deriving said increment sample pulse select duration.

5. The balancing apparatus of claim 4 in which:
    said first counter timer first count value has a digital value of RPERIOD;
    said process control is responsive to derive a said second count value next occurring subsequent to one reference signal as a digital value, TIME0, is responsive to derive a said second count value next occurring subsequent to a next reference signal following said one reference signal as a digital value TIME1, is responsive to derive a value RTIME as a product of N times the said second count value representing the value of said select duration, and is responsive to derive a subsequent said select duration as the value (RTIME plus TIME0 minus TIME1) divided by N.

6. The balancing apparatus of claim 4 in which:
said predetermined number, N, is an even integer power of 2.

7. In a system for deriving balance data of a variety wherein a rotating body to be balanced is subject to balance rotation and wherein a transducer is provided for select balance planes associated with said rotating body during said balance rotation, which transducer derives corresponding vibration output signals, the improved balance analysis apparatus, comprising:
   an input signal treatment network having an amplification stage for receiving said vibration output signals and effecting the amplification thereof in accordance with one of a number of selected gain values to provide amplified vibration signals and further having an integration stage and a solid-state disable switch actuable to effect the disablement of said integration stage;
   a gain control network responsive to a gain select input for providing said select gain values;
   an analog-to-digital converter responsive to said amplified vibration signals and actuable to generate digital sample signals corresponding therewith; and
   a process control for providing an initial gain select input to said gain control network for actuating said converter to effect generation of a predetermined number of initial said digital sample signals, and responsive to said generated initial digital sample signals to derive a said gain select input providing selection of a highest gain input effecting an amplification of said vibration output signals for derivation of said digital sample signals with a predetermined optimum range of values, said process control actuating said solid-state disable switch for a predetermined settlement interval in correspondence with said derivation of said select gain input.

8. The balancing apparatus of claim 7 in which said gain control network comprises a sequence of resistor components coupled for selectively attenuating the amplitude of said vibration output signals, and a solid-state switch responsive to said gain select input for effecting said amplitude attenuation by interposing said select resistor components at said amplification stage to effect said select attenuation.

9. The balancing apparatus of claim 7 in which said process control is responsive to compare the value of said initial digital sample signals with a predetermined narrow range of values less than UpHi and greater than UpLo and for deriving a said gain select input selectively increasing said gain value when the values of all said initial sample signals are within said narrow range.

10. In a system for deriving balance data of a variety wherein a rotating body to be balanced is subject to balance rotation and wherein a transducer is provided for select balance planes associated with said rotating body during said balance rotation which derives corresponding vibration output signals, the improved balance analysis apparatus, comprising:
   an input amplification and signal treatment stage having an input for receiving said vibration output signals and effecting a gain treatment thereof to provide amplified vibration signals at an output and exhibiting a d.c. offset signal term of given polarity;
   grounding means for exhibiting a predetermined standard level signal value;
   a solid-state switch actuable for isolating said amplification and signal treatment stage input from said vibration output signals and applying said standard level signal value thereto;
   an analog-to-digital converter having an input for receiving signals from said input amplification and signal treatment stage output and converting them to corresponding digital signals;
   a digital-to-analog converter network responsive, when enabled, to said digital signals for deriving a d.c. displacement signal in correspondence therewith and of polarity opposite said given polarity for continuous application to said input amplification and signal treatment stage as a substantial cancellation of said d.c. offset signal term; and
   a process control for recurrently actuating said solid-state switch and enabling said digital-to-analog network for effecting the said derivation of a said d.c. displacement signal for subsequent continuous application thereof to said input amplification and signal treatment stage.

11. The balance analysis apparatus of claim 10 in which said predetermined standard level signal value is a substantially zero voltage level.

12. The balance analysis apparatus of claim 11 in which said digital-to-analog converter network includes a reference voltage source of predetermined fixed value, impedance means for deriving a modifying signal term of polarity opposite said given polarity of value selected as about equal to said offset signal term.

13. In a system for deriving balance data of a variety wherein a rotating body to be balanced is subject to balance rotation and wherein a transducer is provided for select balance planes associated with said rotating body during said balance rotation which derives corresponding vibration output signals, the improved balance analysis apparatus, comprising:
   input amplification and signal treatment stage having an input for receiving said vibration output signals and effecting a gain treatment thereof in accordance with one of a number of selected gain values to provide amplified vibration signals at an output and exhibiting a d.c. offset signal term of given polarity;
   a gain control network responsive to a gain select input for providing said select gain values;
   grounding means for exhibiting a predetermined standard level signal value;
   a solid-state switch actuable for isolating said amplification and signal treatment stage input from said vibrational output signals and applying said standard level signal value thereto;
   an analog-to-digital converter having an input for receiving signals from said input amplification and signal treatment stage output and converting them to corresponding digital signals;
   a digital-to-analog converter network responsive, when enabled, to said digital signals for deriving a d.c. displacement signal in correspondence therewith and of polarity opposite said given polarity for continuous application to said input amplification and signal treatment stage as a substantial cancellation of said d.c. offset signal term;
   a process control for recurrently actuating said solid-state switch and enabling said digital-to-analog network for effecting the said derivation of a said d.c. displacement signal for subsequent continuous application thereof to said input amplification and signal treatment stage; and said process control providing an initial gain select input to said gain control network for actuating said converter to effect generation of a predetermined number of initial said digital sample signals, and responsive to said generated initial digital sample signals to derive a said gain select input providing selection of a highest gain input effecting an amplification of said vibration output signals for derivation of said digital sample signals within a predetermined optimum range of values.

14. In a system for deriving balance data of a variety wherein a rotating body to be balanced is rotated at rates providing a period T for each complete revolution, wherein a transducer is provided for select balance planes which derives corresponding vibration output signals, the improved balance analysis apparatus, comprising:
- a reference device responsive to said rotating body for deriving a reference signal with respect to the revolution thereof in correspondence with each said period, T;
- signal treatment staging responsive to said vibration output signals for deriving analog balance signals in correspondence therewith;
- a converter actuable to convert said analog balance signals to digital values; and
- control means responsive to said reference signal with respect to a given revolution of said rotating body and deriving therefrom said period, T, and the duration of each a sequence of a predetermined number, N, of increment sample pulses, said duration substantially corresponding with the value T/N, and effecting said actuation of said converter in correspondence with a said sequence of pulses of said derived duration during a revolution of said rotating body subsequent to said given revolution to effect derivation of said digital values and for generating said balance data therefrom.

15. In a system for deriving balance data of a variety wherein a rotating body to be balanced is subject to balance rotation and wherein a transducer is provided for select balance planes associated with said rotating body during said balance rotation, which transducer derives corresponding vibration output signals, the improved balance analysis apparatus, comprising:
- an input signal treatment network having an amplification stage for receiving said vibration output signals and effecting the amplification thereof in accordance with one of a number of selected gain values to provide amplified vibration signals;
- a gain control network responsive to a gain select input for providing said select gain values;
- an analog-to-digital converter responsive to said amplified vibration signals and actuable to generate digital sample signals corresponding therewith; and
- a process control for providing an initial gain select input to said gain control network for actuating said converter to effect generation of a prdetermined number of initial said digital sample signals, responsive to compare the value of each said initial digital sample signal with a predetermined broad range of values greater than DnHi or less than DnLo and for deriving a said gain select input selectively decreasing said gain value when the value of any said initial sample signal is without said broad range, and responsive to compare the value of said initial digital sample signals with a predetermined narrow range of values less than UpHi and greater than UpLo and for deriving a said gain select input selectively increasing said gain value when the values of all said initial sample signals are within said narrow range, whereby a said gain select input providing selection of a highest gain input is derived effecting an amplification of said vibration output signals for derivation of said digital sample signals within a predetermined optimum range of values.

16. The balancing apparatus of claim 15 in which said gain control network comprises a sequence of resistor components coupled for selectively attenuating the amplitude of said vibration output signals, and a solid-state switch responsive to said gain select input for effecting said amplitude attenuation by interposing select said resistor components at said amplification stage to effect said select attenuation.

17. In a system for deriving balance data of a variety wherein a rotating body to be balanced is subject to balance rotation and wherein a transducer is provided for select balance planes associated with said rotating body during said balance rotation which derives corresponding vibration output signals, the improved balance analysis apparatus, comprising:
- input amplification and signal treatment stage having an input for receiving said vibration output signals and effecting a gain treatment thereof to provide amplified vibration signals at an output and exhibiting a d.c. offset signal term of given polarity;
- a gain control network responsive to a gain select input for providing said select gain values;
- grounding means for exhibiting a predetermined standard level signal value;
- a solid-state switch actuable for isolating said amplification and signal treatment stage input from said vibration output signals and applying said standard level signal value thereto;
- an analog-to-digital converter having an input for receiving signals from said input amplification and signal treatment stage output and converting them to corresponding digital signals; and
- control means for recurrently actuating said solid-state switch and responsive to the said digital signals derived in consequence of each said actuation for effecting the updated cancellation of said d.c. offset signal term.

* * * * *